United States Patent [19]
Karlson

[11] 3,910,842
[45] Oct. 7, 1975

[54] TWIN BELT ION EXCHANGE SYSTEM

[76] Inventor: Eskil L. Karlson, 43 Westover Lane, Stamford, Conn. 06902

[22] Filed: Jan. 6, 1975

[21] Appl. No.: 539,019

[52] U.S. Cl. ............... 210/252; 210/269; 210/401; 210/484; 210/502
[51] Int. Cl.² ........................................ B01D 15/04
[58] Field of Search ............................. 210/31–33, 210/252, 269, 275, 400, 401, 386, 484, 485, 502

[56] References Cited
UNITED STATES PATENTS

| | | | |
|---|---|---|---|
| 1,538,742 | 5/1925 | Price | 210/400 X |
| 2,222,828 | 11/1940 | Guthrie | 210/400 X |
| 2,273,557 | 2/1942 | Bonotto | 210/33 X |

OTHER PUBLICATIONS

"Continuous Ion Exchange with an Endless Belt of Phosphorylated Cotton," in *Industrial and Engineering Chem.* Vol. 47, No. 3 by Muendel and Seire, pp. 374–379.

*Primary Examiner*—John Adee
*Attorney, Agent, or Firm*—Buckles and Bramblett

[57] ABSTRACT

There is disclosed a system for removing both anions and cations from solution. A pair of endless belts are employed, one belt has incorporated into its construction an anion exchange resin and the other belt has so incorporated a cation exchange resin. Both belts are passed through the flowing solute in a direction opposite to its flow while simultaneously making a number of traversals perpendicular to the fluid flow. All the fluid is caused to pass through each belt a plurality of times. The fluid is thereby substantially deionized. Upon leaving the flowing liquid, the anion belt is passed through an anion resin regeneration tank where it is stripped of its captured anions and regenerated prior to returning to the fluid under treatment. The cation belt similarly is removed from the fluid under treatment and passes to a cation resin regenerating tank where it is similarly stripped of captured cations and regenerated prior to return to the fluid.

18 Claims, 6 Drawing Figures

TWIN BELT ION EXCHANGE SYSTEM

BACKGROUND OF THE INVENTION

In applicant's co-pending application Ser. No. 448,019 filed Mar. 4, 1974 for "Improvements to Fluid Treatment Apparatus", there is disclosed an ion exchange system comprising a tank through which flows the fluid to be treated and an endless belt permeable to water. The belt has incorporated therein an ion exchange resin. This belt makes a series of traversals through the fluid substantially perpendicular to the fluid flow with overall belt travel proceeding in a direction opposite the fluid flow. During these traversals, the fluid is caused to flow through the belt and the resins pick up the unwanted ions. The loaded belt then leaves the treatment tank and is passed through a regeneration tank where the unwanted ions are removed and the resin restored to its original condition prior to returning to the treatment tank.

The system described in the co-pending application has a number of important advantages over the prior art. However, since the resin incorporated into the belt is either a cation remover or an anion remover, it functions by replacing one ion with another. For example, a simple zeolite water softener functions by removing the undesirable ions of magnesium and calcium and replacing them with sodium ion. If deionized water is desired, it must be passed sequentially through two tanks, each containing a different resin. The material in the first tank is acidic and serves to capture the positive metallic ions, while releasing hydrogen ions. The output from the first tank is passed through a second tank which contains a basic substance where the negative ions remain and hydroxide ions are released to combine with the hydrogen ion in the water. The substances in the two tanks are rechargeable but by different solutions — namely, sulfuric acid and sodium hydroxide. If it were not for this fact, the resins could be mixed in a single tank. However, as they could not be recharged, the resins would have to be discarded at regular intervals and replaced.

A similar problem is faced if it is desired to deionize water by the belt system described in the aforementioned pending patent application. The effluent from the treatment tank would have to be passed through another system substantially identical except for the resin contained in the belt. Alternatively, a belt could be constructed incorporating both resins. However, it would not be possible to recharge the belt and it (or its resins) would have to be discarded at regular intervals, which, of course, would be a completely unrealistic solution.

Accordingly, it is a primary object of the present invention to provide a system for deionizing a solution by the belt method while employing a single treatment tank.

Other objects are to provide such a system utilizing two belts including, respectively, anion and cation exchange resins; to provide such a system wherein the belts may be separately regenerated; to provide such a system wherein the fluid flow rate through the treatment tank is maintained at a high level; to provide such a system wherein the belt construction is such as to insure maximum resin contact; and to provide such a system wherein the belt construction is such as to cause minimum wear and maximum smoothness of operation. The manner in which these objects are achieved will be apparent from the following description and appended claims.

SUMMARY OF THE INVENTION

In accordance with the present invention, means are provided for containing the solution to be treated and for flowing the fluid therethrough in a first direction. A first, endless, fluid permeable belt having incorporated therein a first substance capable of removing anions is passed through the fluid containing means in a second direction opposite the first direction in a series of traversals substantially perpendicular to the first and second directions. A second endless fluid permeable belt having incorporated therein a second substance capable of removing cations is similarly moved through the fluid. Means are provided for treating the first belt after passage through the fluid to restore the anion removal capability of the first substance and means are provided for treating the second belt after passage through the fluid to restore the cation removal capability of the second substance.

DESCRIPTION OF THE PREFERRED EMBODIMENTS

Figure 1:
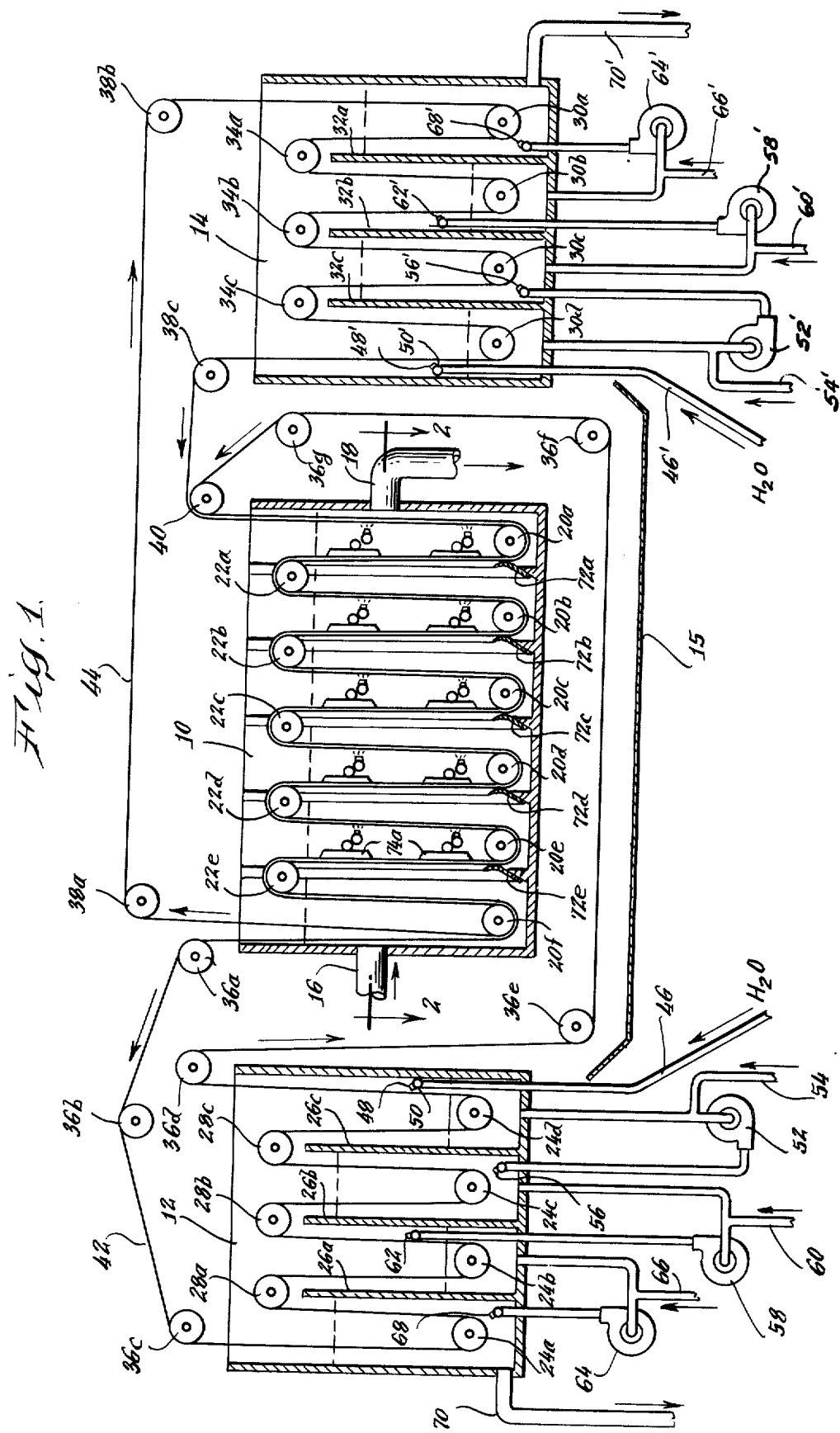
FIG. 1 is an elevational cross section of water treatment apparatus embodying the present invention.

FIG. 1 illustrates in generalized form apparatus for deionizing water utilizing applicant's endless belt technique. It comprises a deionizing tank 10, a cation regeneration tank 12, an anion regeneration tank 14, and a drip pan 15. Water to be deionized enters tank 10 through an inlet 16 and deionized water leaves tank 10 through outlet 18. Mounted along the bottom of tank 10 are a plurality of bottom rollers 20 $a$–$f$. Along the top of tank 10 there are provided a plurality of upper rollers 22 $a$–$e$. A somewhat similar arrangement exists in tank 12 wherein bottom rollers 24 $a$–$d$ are separated by intermediate partitions 26 $a$–$c$ surmounted by upper rollers 28 $a$–$c$. Tank 14 is identical in construction to tank 12 and includes the lower rollers 30 $a$–$d$, partitions 32 $a$–$c$, and upper rollers 34 $a$–$c$. A plurality of external rollers 36 $a$–$g$, 38 $a$–$c$, and 40 are positioned to direct the passage of the belts through the various tanks in a manner to be described. One or more of these rollers may be driven to propel the belts.

A cation exchange belt 42 is directed through the deionizing tank 10 and the cation regeneration tank 12 by means of rollers 36. An anion exchange belt 44 is similarly directed through the deionizing tank 10 and the anion regeneration tank 14 via rollers 38. The belts may be constructed in the manner disclosed in the referenced copending application or, alternatively, in the manner to be described below. In any event, both belts are permeable to water and incorporate the respective acidic or basic resin therein. The belts overlie one another from pulley 40 through a number of traversals over rollers 20, 22 in tank 10. Upon leaving the last roller 20f, the belts are separated, the cation belt 42 proceeding via rollers 36, into the cation regeneration tank 12. Within tank 12 the belt 42 makes a number of traversals, being guided over rollers 24, 28 and traverses each of the compartments formed within tank 12 by the partitions 26.

The flow of fluid within the tank 12 is opposite to the direction of travel of the belt 42. Thus, in the last chamber traversed by the belt and containing roller 24d, water is supplied through a line 46. The water is sprayed on the belt 42 by means of a plurality of spray heads 48 connected to a header 50. Water which collects in this chamber is pumped out by the pump 52 which also has its inlet connected to an acid supply line 54. The resultant dilute acid is sprayed on the belt in the next chamber via spray heads 56. The fluid in this chamber is extracted by pump 58 which also receives extra acid through supply line 60 and sprays the solution on the belt in the next chamber with spray heads 62. Similarly, pump 64 which receives extra acid from supply line 66, pumps solution from the chamber containing roller 24b and sprays belt 42 through spray heads 68 as it passes over roller 24a. The waste solution leaves tank 12 via drain line 70.

The fluid piping for anion regeneration tank 14 is identical to that of tank 12. Accordingly, a detailed description will not be given. The elements of such piping are given identical reference numerals as those of tank 12 but with a prime (') attached. An important difference is that the supply lines 54', 60', 60', instead of being connected to an acid supply, are connected to a base supply.

Figure 2:
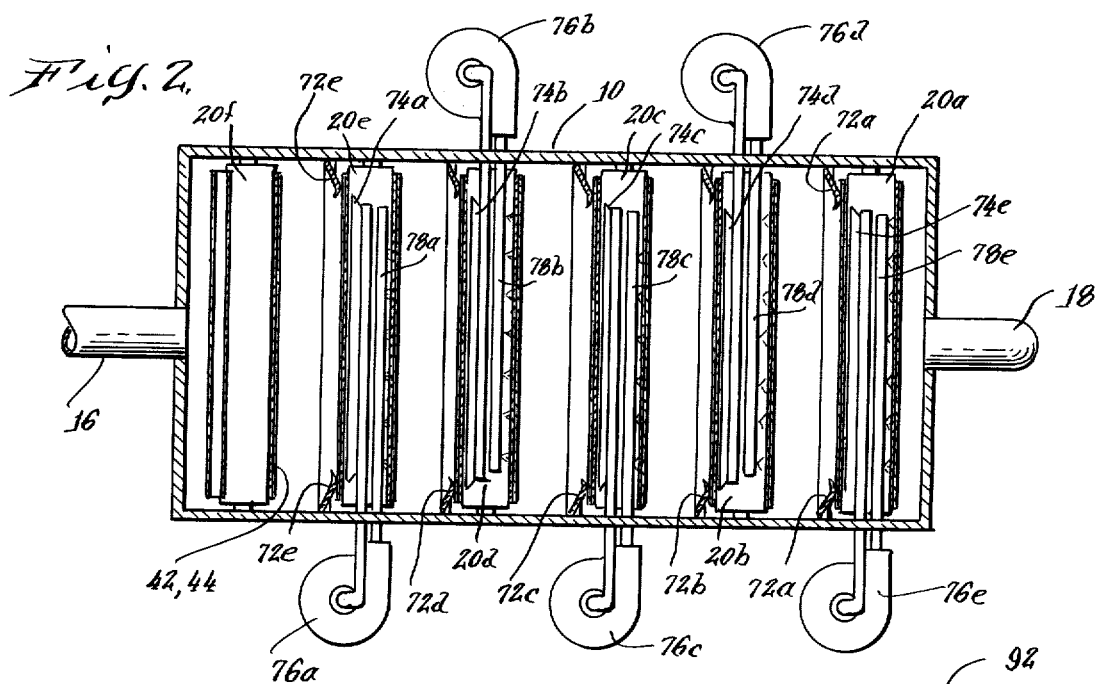
FIG. 2 is an enlarged cross section taken substantially along the line 2—2 of FIG. 1.

The construction of deionizing tank 10 will be best understood by reference to FIGS. 1 and 2. The belts, in moving from right to left as viewed in FIG. 1, make a plurality of vertical traversals as explained so as to pass over the rollers 22 which are above the liquid level. At the location of each upward traverse from a roller 20 to a roller 22, there is provided a rubber dam 72 a–e. These dams are in the form of resilient rubber blades which extend across the bottom of the tank 10 and up each side and are in contact with the belts 42, 44. These dams prevent liquid from passing around the belts. They are omitted from approximately half the traversals for a reason to be described below.

It will be understood that the resistance to fluid flow through the combined belts 42, 44 is relatively high. Without some means of alleviating this condition, the liquid head in each section of tank 10 defined by the rubber dams 72 would progressively decrease in the direction of fluid flow from left to right as viewed in FIG. 1. This condition is alleviated by the apparatus illustrated most clearly in FIG. 2. On the downstream side of each belt portion which is engaged by the rubber dams 72, there is mounted a suction box 74 a–e. Each suction box is connected to the inlet of a pump 76 a–e. The discharge of each pump 76 is connected to a header 78 a–e which defines a plurality of discharge jet openings directed against the subsequent belt traversals. As previously explained, these traversals do not have the rubber dams 72 as seen in FIG. 2. As a result, some of the liquid which is thus forced through the belt surfaces by the pump action is caused to return around the edges of the belts to thereby pass through the belt surfaces a second time to enhance the exchange reaction within the belt.

Figure 3:
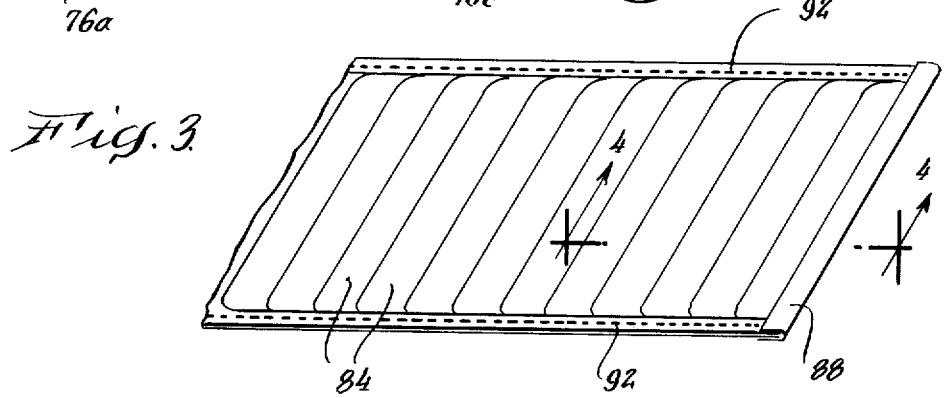
FIG. 3 is an illustration of a belt usable in the present invention.
Figure 4:
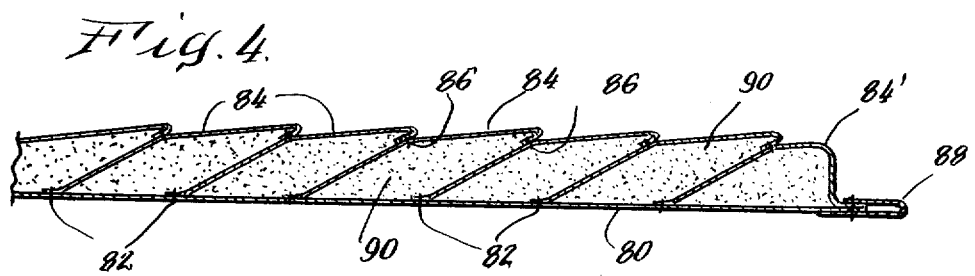
FIG. 4 is an enlarged cross section taken substantially along the line 4—4 of FIG. 3.
Figure 5:
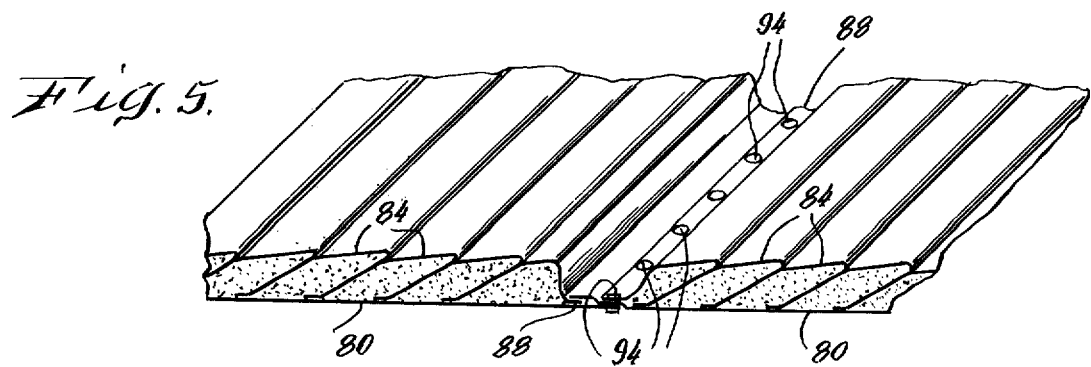
FIG. 5 is a perspective illustration of the means employed to join the ends of the belt.

As previously explained, the belt construction employed in the copending patent application may be employed in this invention. However, there is illustrated in FIGS. 3–5 a preferred belt construction which has the advantages of increased smoothness in riding over the various rollers, increased fluid-resin contact, greater resin retention, and prevention of fluid flow except through the resin containing portions. As viewed in cross section in FIG. 4, each belt comprises a fabric base 80 to which are stitched along lines 82 a plurality of individual fabric pouch strips 84. The fabric may be woven from monofilament fibers chemically inactive with the solutions to be encountered. The leading edge of each of the pouch strips 84 is stitched to the succeeding strip along a line 86 as shown in FIG. 4. The leading edge of the forwardmost strip 84' is stitched to the base strip 80. The individual pouches so formed are filled with the active ion exchange resin 90 and their ends are closed by stitching 92. Secured to each end of the belt is an elongated U-shaped clip 88 which may be of metal or plastic. After being properly installed, the ends of the belt are joined by means of bolts 94. As the end clips 88 are of a solid material and as the stitched edges of the belt are contacted by the rubber dams 72, it will be apparent that all of the liquid which passes through tank 10 is forced through the resin 90 within the belt.

EXAMPLE

Figure 6:
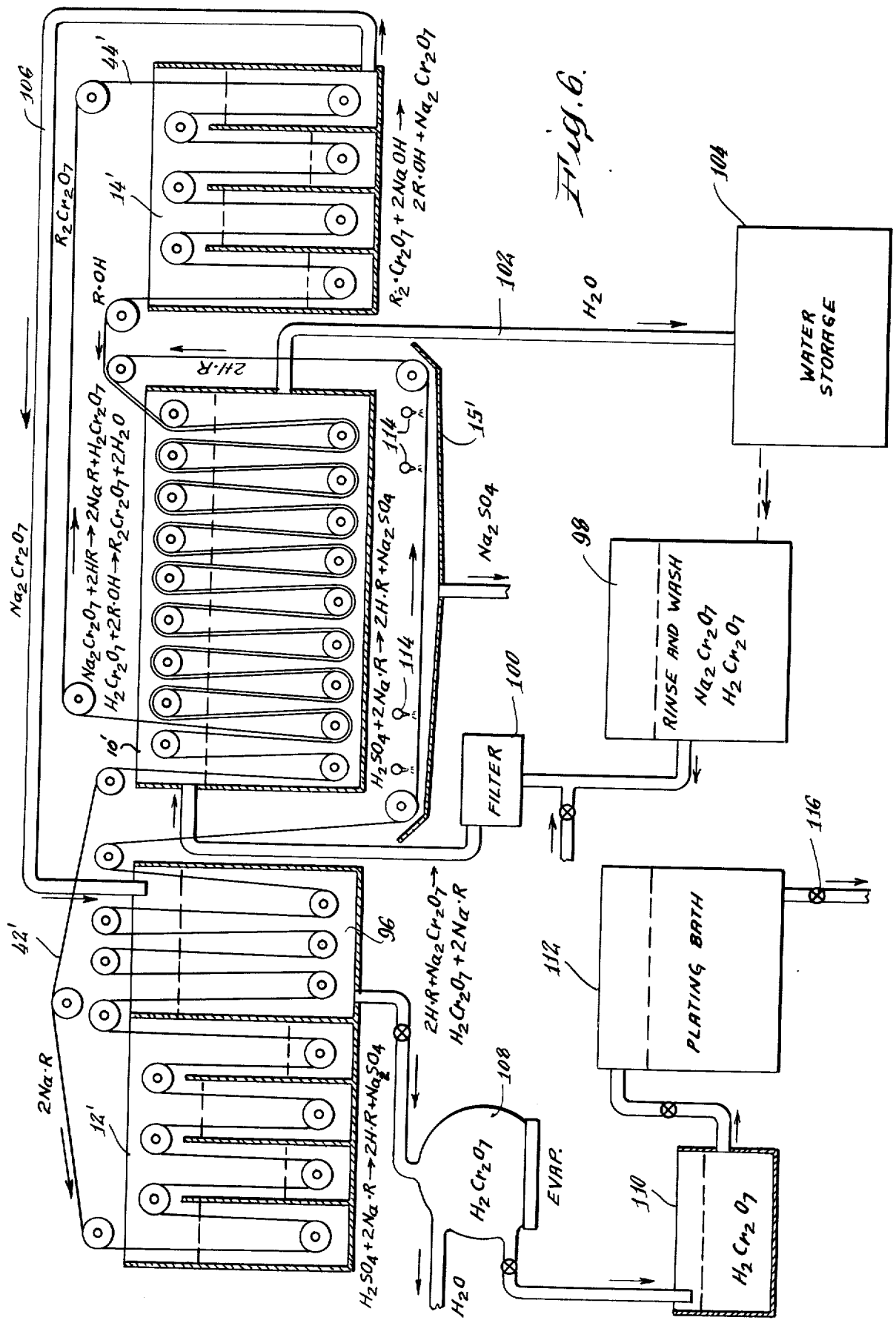
FIG. 6 is an illustration similar to FIG. 1 but with the apparatus modified for a specific application.

In FIG. 6, there is illustrated a flow diagram of a system in accordance with this invention, particularly designed for the recovery and reuse of chromic acid in the electroplating and anodizing industry. In view of the fact that there is a short supply of chromium, its high cost will, in time, pay for a recovery system. In the recovery system to be described herein, the rinse water is collected after an article has been chrome plated. This rinse water contains chromic acid and chromates picked up in the plating tank. The rinse water is filtered to collect rough particulates and oil and is then directed into a deionizing tank. The disclosed system minimizes discharge of chromium waste solutions in accordance with current waste effluent laws, provides a demineralized water makeup for wash and rinse requirements, and upgrades the product quality. In addition, it will keep contaminating metal ions in the system at a low level, making for a more efficient plating operation.

With particular reference to FIG. 6, there is illustrated a flow diagram which incorporates certain elements similar to those previously described which, accordingly, are not illustrated in detail but are given similar reference numerals with a prime (') attached. These include a deionizing tank 10', a cation regeneration tank 12', an anion regeneration tank 14', a drip pan 15', and the cation 42' and anion 44' exchange belts. The piping, fluid supply, damming, and other constructional features may be as previously described. There is an additional conversion tank 96 through which the cation exchange belt 42' is caused to pass after it leaves cation regeneration tank 12'.

A rinse and wash tank 98 contains the rinse water resulting from a chrome plating operation. This rinse water contains chromic acid and chromates. It is passed from the tank 98 through a filter 100 where rough particulates and oil are removed and is then directed into the deionizing tank 10'. The solution passes a plurality of times through the cation exchange belt 42' and the anion exchange belt 44'. In passing through the cation exchange belt, the following reaction takes place:

$$Na_2Cr_2O_7 + 2HR \rightarrow 2\ NaR + H_2Cr_2O_7$$

Where R represents the complex resin molecule. In passing through the anion exchange belt, the following reaction takes place:

$$H_2Cr_2O_7 + 2\ R.OH \rightarrow R_2Cr_2O_7 + 2\ H_2O.$$

As a result of these two reactions, pure deionized water leaves the tank 10' via discharge line 102 and is thereafter stored in storage tank 104.

The anion belt, which is loaded with chromium in the form $R_2Cr_2O_7$ is carried into the regenerating tank 14' where it is stripped by sodium hydroxide and regenerated in accordance with the equation:

$$R_2Cr_2O_7 + 2\ NaOH \rightarrow 2\ R.OH + Na_2Cr_2O_7.$$

This sodium chromate is then transferred, via transfer line 106 to the conversion tank 96.

The cation exchange belt 42' is regenerated in tank 12' by means of sulphuric acid in accordance with the equation:

$$H_2SO_4 + 2\ NaR \rightarrow 2\ HR + Na_2SO_4.$$

The belt thereafter passes through the conversion tank 96 where it reacts with the sodium chromate to produce chromic acid in accordance with the equation:

$$2\ HR + Na_2Cr_2O_7 \rightarrow H_2Cr_2O_7 + 2\ NaR.$$

The chromic acid so produced then goes through an evaporator 108 where part of the water is removed and thereafter goes to a storage tank 110. The acid may thereafter be utilized in the plating bath 112 as required.

Before the belt 42' is caused to return to the main deionizing tank 10', it may be regenerated by means of sprays 114 of sulphuric acid over the drip pan 15' in the same manner as in regeneration tank 12'.

The cation belt may have embedded within it a strong acid hydrogen form cation resin, such as resins numbers C–242, C–251, or C–256 of the Ionac Chemicals Company. These resins will pick up metallic ions and may be stripped by a wash in sulphuric acid. The belt will also convert the sodium chromate to chromic acid which is collected and evaporated to form the makeup solution for use in the plating bath as explained. This makeup solution will be free from metallic cations such as copper, iron, and aluminum and can be continually upgraded by draining off small portions via valve 116.

The anion belt includes a strong base anion resin such as Ionac Chemical Company's Ionac ASB–1 or No. A–540. These resins have good absorption and fast regeneration time. In the regeneration of this anion belt, an efficiency of nearly 100% can be obtained by using 3 lbs. of caustic soda per cubic foot. The eluant contains fairly pure sodium chromate.

The foregoing regeneration levels are computed for loadings of about 3.7 lbs. $CrO_3$ per cubic foot and 5.2 lbs. $CrO_3$ is eluted as sodium chromate.

The basic advantages of the belt system just described are its economic advantages in saving on chemical costs, providing demineralized water, reducing waste effluent problems, and producing a more efficient plating operation. Another saving is the rinse water recovery. This water may be used as makeup in the rinse tank, plating tank, or as a final belt clean-rinse cycle just before the belts leave their regeneration tanks. Another great advantage of this type of ionic exchange system is that it is highly flexible. Not only can the amounts of reagents used in this system be maximized for efficiency, but the belt speeds can also be maximized to produce the most efficient operation as to pickup and the use of the least amount of reagents.

It will be apparent to those skilled in the art that a number of variations and modifications may be made in this invention, without departing from its spirit and scope. Accordingly, the foregoing description is to be construed as illustrative only, rather than limiting. This invention is limited only by the scope of the following claims.

I claim:

1. Apparatus for substantially deionizing solutions comprising: means for containing the solution to be treated; means for flowing said solution through said containing means in a first direction; a first endless fluid permeable belt having incorporated therein a first substance capable of removing anions; a second endless fluid permeable belt having incorporated therein a second substance capable of removing cations; means for passing each of said belts through said solution containing means in a series of traversals substantially perpendicular to said first direction; means for treating said first belt after passage through said solution to restore the anion removal capability of said first substance; and means for treating said second belt after passage through said solution to restore the cation removal capability of said second substance.

2. The apparatus of claim 1 wherein said passing means comprises: a plurality of rollers within said solution containing means arranged to receive and transport said belts through said traversals in juxtaposed relationship.

3. The apparatus of claim 2 wherein said solution containing means comprises a tank having spaced sidewalls and a bottom; said rollers comprise a first set of upper rollers mounted in the upper portion of said tank and a second set of lower rollers mounted in the lower portion of said tank; and said solution containing means further comprises a plurality of fluid impervious dams extending between said walls and bottom and into engagement with selected vertical portions of said belts whereby solution flow at each said portion is substantially solely restricted to flow through said portion.

4. The apparatus of claim 3 wherein said dams are positioned against alternate vertical portions of said belts.

5. The apparatus of claim 4 wherein said solution flow means comprises: a suction box mounted against the downstream surface of the juxtaposed belts of each dammed portion; solution ejection means directed against the upstream surface of the following undammed portion; and means for pumping solution from said suction box to said ejection means.

6. The apparatus of claim 1 wherein each of said belt treating means comprises: a plurality of fluid reservoirs; and means for passing an associated belt sequentially therethrough.

7. The apparatus of claim 1 wherein each of said belt treating means comprises: a plurality of fluid reservoirs; means for passing an associated belt sequentially therethrough; means for supplying fluid to each of said reservoirs; and means for draining fluid from each of said reservoirs.

8. The apparatus of claim 7 wherein said fluid supplying means comprises: fluid ejection means directed against the surface of said belt.

9. The apparatus of claim 8 wherein said fluid draining means comprises a pump connected to supply the fluid ejection means of a succeeding reservoir.

10. The apparatus of claim 9 wherein the direction of fluid flow through successive reservoirs is opposite to the travel of said belt therethrough.

11. The apparatus of claim 7 wherein the fluid supplying means of the first belt treating means supplies a base and the fluid supplying means of the second belt treating means supplied an acid.

12. The apparatus of claim 1 wherein each of said belts comprises: a fluid permeable base member having a length substantially greater than its width; a plurality of fluid permeable strips secured transversely thereto in spaced relationship along the length of said belt, one long edge of each of said strips being secured to said base member and the other long edge being secured to an adjacent strip, the ends of said strips being secured to said base member along the edges thereof to form a plurality of pouches extending transversely of said base member; an ion exchange resin filling each of said pouches whereby said belt is caused to have substantially parallel, opposed, substantially planar face surfaces; and means for joining the ends of said belt to form an endless belt.

13. An ion exchange belt which comprises: a fluid permeable base member having a length substantially greater than its width; a plurality of fluid permeable strips secured transversely thereto in spaced relationship along the length of said belt, one long edge of each of said strips being secured to said base member and the other long edge being secured to an adjacent strip, the ends of said strips being secured to said base member along the edges thereof to form a plurality of pouches extending transversely of said base member; an ion exchange resin filling each of said pouches whereby said belt is caused to have substantially parallel, opposed, substantially planar face surfaces; and means for joining the ends of said belt to form an endless belt.

14. The belt of claim 13 wherein each of said base member and strips is fabric.

15. The belt of claim 14 wherein said fabric is woven from monofilament fibers.

16. The belt of claim 13 wherein said joining means comprises: a fluid impermeable strip extending the width of said belt at each end thereof; and means for releasably securing said strips to one another.

17. The belt of claim 16 wherein each of said fluid impermeable strips is of substantially U-shaped cross section and engages therein said base member and one of said fluid permeable strips.

18. The belt of claim 17 wherein said securing means are bolts.

* * * * *